Reissued May 10, 1938 Re. 20,719

UNITED STATES PATENT OFFICE 20,719

IMPREGNATION OF METALS WITH SILICON

Harry K. Ihrig, Milwaukee, Wis., assignor to Globe Steel Tubes Co., Milwaukee, Wis., a corporation of Delaware No Drawing. Original No. 2,109,485, dated March 1, 1938, Serial No. 86,823, June 23, 1936. Application for reissue March 17, 1938, Serial No. 196,429

30 Claims. (Cl. 148—14)

This invention relates to the impregnation of metals with silicon, more especially to silicon cementation of ferrous base articles.

The ability of silicon to increase the resistance of a metal or alloy to corrosion or to scaling at elevated temperatures, and to increase electrical resistivity is well known, and especially is this true of iron and its alloys. Thus, it has been known for many years that steel containing substantial amounts of silicon is highly resistant to the action of certain corrosive media, especially mineral acids, such as sulfuric acid. This property of high-silicon steels has been made use of commercially in apparatus required to resist chemical attack. Despite their excellent behavior in that regard these alloys suffer, however, from serious disadvantages which have militated against them.

A chief drawback results from the fact that for adequate resistance to attack of, for example, strong acids the content of silicon must be rather high, above about 7 per cent, and suitably even higher. Unfortunately, however, such alloys are so extremely brittle that wrought articles can not be made from them, and the cast articles are quite susceptible to breakage by shock or sudden changes of temperature.

These alloys likewise can not usually be machined so that any finishing must ordinarily be done by a grinding operation. The restriction to cast articles, the difficulties in finishing the castings for use, and the liability to breakage, with their attendant cost burdens, have retarded the widespread use of the iron-silicon alloys.

Attempts have been made heretofore to avoid the foregoing disadvantages by cementation of metallic articles with silicon, i. e., by siliconizing of such articles. For instance, iron or steel articles have been packed in powdered silicon or ferro-silicon and subjected to heat in much the same manner as case carburizing is effected. As far as I am aware, however, all prior attempts and proposals have been incapable of and unsuited for commercial application, either because they result in cases which are not sufficiently resistant to corroding media, or because the cases are brittle and spall readily from the core. Likewise, as far as I am aware such cases as have been produced were so thin as to be of little value.

Irons low in carbon and high in silicon are desirable also for some electrical uses because they exhibit low hysteresis and eddy current losses. Generally, such materials are needed in the form of thin punched sheets, but heretofore the art has been restricted to material containing at most about 6 per cent, and commonly not over about 4 per cent, of silicon because irons with large contents of silicon can not be rolled satisfactorily. Even so, punching of thin sheets of these iron-silicon alloys presents difficulties. Higher contents of silicon would be desirable but such alloys can not be fabricated. Also, it is difficult or expensive to make these alloys with sufficiently low contents of carbon and impurities.

Again, it would be desirable for some purposes to use high-silicon ferrous base alloys for welding, or for metallizing by metal spraying processes. This has not been feasible heretofore, however, because commonly the metal used has been in the form of rod or wire, and high-silicon irons and steels could not be obtained in those forms.

A major object of this invention is to provide a method of siliconizing metallic, especially ferrous, articles which is rapid, relatively cheap, controllable to vary not only the depth of silicon penetration but also the concentration of silicon in the case, provides coherent and adherent siliconized cases possessing the desirable corrosion-resistant properties of the high-silicon steels referred to hereinabove, by which the article may be impregnated throughout its structure, if desired, which is applicable to articles fabricated to completed form and size prior to cementation, whether cast or wrought, which is readily practiced in simple apparatus, and which does not cause any objectionable change in size of the article.

A further object of the invention is to provide a method embodying the foregoing advantageous features and which is applicable to tubular and cylindrical articles to provide their entire exposed surfaces with uniformly deep siliconized cases.

Still another object of the invention is to provide a method of the foregoing type in which the properties of the case may be modified as to their mechanical or chemical characteristics by providing a case comprising silicon and another cementing metal.

Yet another important object is to provide metallic articles, especially articles made from irons and steels, which are provided with a silicon-bearing case overlying a core or backing of the metal from which the article is formed, which provide desirable characteristics, such as resistance to corrosion or heat or wear, or combinations thereof, at exposed or working surfaces while avoiding or minimizing the troubles encountered heretofore, which can be made easily and cheaply, and which possess other desirable properties and features that will presently appear in the following description.

Another object is to provide wrought articles, particularly in thin sheet and wire form, impregnated throughout with a high content of silicon.

Still other objects will appear from the following specification.

The invention is predicated on my discovery that difficulties encountered heretofore in siliconizing metals are overcome largely or completely, and especially satisfactory silicon impregnation may be obtained, by heating the article under non-oxidizing conditions and contacting it with a reagent formed by heating a silicon material, such as silicon carbide, elemental silicon, or ferro-silicon, or mixtures of such materials, in a current of chlorine gas or of vapor of a suitable chloride. The method thus provided may be practiced in a variety of ways, and it may be modified to suit the product to the use for which it is intended.

A particularly satisfactory cementing agent and procedure for many purposes, particularly for ferrous metals, is afforded by heating the article to an elevated temperature in the presence of silicon carbide (SiC) in a closed container and passing chlorine gas into the chamber when the article has been brought up to heat. Thereby silicon is diffused into the article undergoing treatment. Actual tests of the process have shown, for example, that particularly satisfactory siliconizing is attained by disposing the article in contact with the silicon carbide, as by packing the article in powdered SiC, heating them under non-oxidizing conditions to a suitable temperature, and then introducing chlorine gas into the chamber. The SiC-$Cl_2$ agent acts in some manner, the mechanism of which is not now fully understood, to cause relatively rapid and uniform diffusion of silicon into the article.

In another embodiment of the invention the article to be silicon-cemented is heated in a closed container and contacted with reagent generated outside of the container, as by heating ferro-silicon or silicon carbide in a separate container and passing chlorine into it, the effluent gases being then passed into contact with the heated article. Generally speaking, however, this procedure is less advantageous than that in which the reagent is generated in the presence of the article, as just described, because the use of higher temperatures is involved in this embodiment, as will appear hereinafter.

The grain size of the silicon material appears to be not a critical factor, at least for many purposes. I have used satisfactorily silicon carbide from 100-mesh to lumps one-fourth inch in size. Also, the pure carbide need not be used, for good results have been obtained not only with pure graded grits but also with the crude lump carbide and with crushed particles made from silicon carbide. Where the article is actually contacted with, or packed in, the carbide it will usually be desirable to have it relatively finely divided, however. Likewise, ferro-silicon may be used in varying degrees of subdivision, and the exact content of silicon seems to be not critical in attaining the desired result. Thus, ferro-silicons containing 14 per cent, 50 per cent and 90 per cent of silicon have produced excellent cases.

After the article has been brought up to heat a current of chlorine gas is passed into the siliconizing agent and the reaction gases effect the desired cementation.

Agents other than gaseous chlorine can be used to reach the same result. Thus, there may be used a current of various chloride vapors, which also produce satisfactory siliconizing. Among the chlorides shown by actual tests to be suitable for this purpose are ammonium chloride ($NH_4Cl$), calcium chloride ($CaCl_2$) ferric chloride ($FeCl_3$), manganese chloride ($MnCl_2$), copper chloride ($CuCl$ or $CuCl_2$), nickel chloride ($NiCl_3$), and sodium chloride ($NaCl$).

The use of mixtures of these chlorides and silicon carbide or ferro-silicon for packing the article to be treated (instead of using a current of chloride vapor) is not feasible for a variety of reasons. Chief among these are the necessity for using great excesses of chloride due to the large loss of chloride by volatilization during heating, substantial attack of iron and steel by such vapors at the temperatures involved, and the formation of a product of less satisfactory character. As to this latter point, the use of such a mixture gives a product in which the case and core are discontinuous, being separated, as appears under the microscope, by a stratum whose character is unknown but which engenders spalling of the case. And when using such a mixture there may occur intergranular corrosion of the article in bringing it up to temperature.

The depth of silicon cementation can be controlled according to the time and temperature of exposure to the agent, and by the amount of silicon supplied to the article, so that cases of almost any thickness can be produced, and, in fact, if desired for any reason the article can be impregnated with silicon throughout. For instance, I have completely impregnated the walls of steel tubes one-eighth of an inch thick, rods 0.125 inch in diameter, and thin sheet material.

Likewise, the concentration of silicon in the case is susceptible of control. By supplying the silicon to the surface of the article at a rate in excess of its rate of diffusion into the article the case will throughout have a concentration of from about 12 to 15 per cent of silicon. If, however, the silicon is supplied at a rate less than its diffusion rate into the article the resultant case will be poorer in silicon. Accordingly, the cases can be controlled as to silicon content to adapt them to particular conditions of use. Such control is achieved through regulation of the rate of chlorine or chloride addition, the treating temperature, and the particular siliconizing agent used.

Regulation of the rate at which the silicon is supplied to the article affords control of the content of silicon in the case. Thus, it thereby becomes possible to provide articles with varying degrees of resistance to corrosion, heat or abrasion, or combinations of those properties, depending upon the concentration of silicon in the case. Such control may be advantageous also in special instances, for instance, in the application of silicon cases to high chromium and other steels which are austenitic. Thus, if no attention is paid to the rate of silicon diffusion the silicon case on these austenitic steels may tend to crack off upon repeated heating and cooling. I have found, however, that this difficulty may be overcome by supplying the chlorine very slowly so that the diffusion rate of the silicon into the steel is greater than the rate at which the silicon is supplied to it, thus producing a case containing about 5 per cent silicon and of high adherence. Such cases on these steels afford adequate resistance to scaling at high temperatures.

For most purposes silicon carbide is preferred. Using this agent in contact with the article cementation is attainable with ferrous articles at temperatures as low as 1600° F., and excellent results at 1800° F. Somewhat lower temperatures, e. g. 1500° F., can be used under the same conditions using ferro-silicon as the silicon material. Ferro-silicon has the advantage that it reacts more rapidly with chlorine, and thus provides silicon diffusion at a higher rate with consequent greater silicon concentration in the case, than does silicon carbide. However, the cases produced using ferro-silicon are characterized by having a rougher surface than those formed using silicon carbide.

This latter disadvantage can be minimized, however, as I have discovered, by the conjoint use of both silicon materials. For instance, a mixture of 10 parts of 50 per cent ferro-silicon and 90 parts of silicon carbide provides a case of excellent corrosion resistance and of satisfactory surface quality. Another procedure is to contact the article initially with silicon carbide and treat it with chlorine, or chloride vapor, for a period of time, say one and one-half hours, and then add ferro-silicon. Thereby there is obtained a smooth-surfaced case, and the later use of ferro-silicon affords a concentration of reagent gases which gives rapid and deep silicon cementation.

As just stated, a temperature of 1800° F. suffices for most purposes, when treating ferrous articles, where the article is in contact with the silicon material. Where the latter material is treated with chlorine or chloride in a separate chamber higher temperatures are necessary. Thus, the article should be heated to about 1800° F. in its chamber, but with the generator at 1800° F. almost no case is produced. If the generator is heated to 1850° F. thin cases are produced on ferrous articles, but to produce thick cases of high silicon content the generator must be heated to about 2300° F. In addition, this embodiment may cause some carburization when the generator is operated at 2300° F.

It might be supposed that the materials react to form silicon tetrachloride which then is the active cementing agent. However, that reaction requires at least 142 pounds of chlorine per 40 pounds of silicon carbide, whereas in actual operation of the process on a commercial scale wholly satisfactory results are had through the use of chlorine to the extent of only 10 per cent of that stoichiometrically needed to produce $SiCl_4$, which is far below the theoretical amount just stated. If silicon tetrachloride were the cementing agent it would be expected that little cementation would occur using such a small fraction of the chlorine necessary to produce that compound. Actually, however, an increase in the amount of chlorine does not affect the case appreciably, if at all.

Moreover, chlorine is not necessary for the purposes of the present invention because other agents may be used. For example, satisfactory siliconizing has been obtained in the practice of the invention by the use of a mixture of silicon carbide and copper oxide (CuO).

For these reasons I believe that silicon tetrachloride is not the active cementing agent. On the contrary, my present belief, although I do not limit myself to this theory, is that by some combination of reactions silicon is liberated in nascent, or atomic, condition and that in that form it impregnates easily and rapidly. In such a mechanism the chlorine could act cyclically which would explain why such small amounts suffice.

Another peculiarity of the process is that the chlorine causes little attack of the container. Chambers of common steels have been used in operations on a commercial scale for many hundreds of runs, whereas it would be expected that chlorine at 1800° F. would cause extremely rapid attack of the containers. The pipe through which the gas is introduced may be attacked somewhat in the region outside of the container, but this can be avoided by using graphite tubes, or by inserting a graphite liner in the steel tube. No such liner is needed in the container.

One feature of the use of chlorides is that by appropriate selection of a metallic chloride the metal of the chloride will likewise enter the case. This is advantageous in some instances because thereby the properties, either chemical or mechanical, or both, of the case can be modified to meet particular operating conditions. For instance, the use of copper chloride produces a case of silicon and copper, and the copper appears to increase the ductility of the case, which is, of course, desirable.

Composite cases can be formed also by introducing elemental metal or alloy into the siliconizing agent. Thus, a small amount of metallic copper can be mixed with, for example, silicon carbide, the article is packed in the mixture and heated in a non-oxidizing atmosphere and treated with chlorine, as just described, to cause the formation of a silicon-copper case. Or, metallic copper may be added to mixtures of silicon carbide with copper, or other, chloride, and used as just described to reach the same result.

The metal which is added to the silicon material may likewise be in the form of an alloy. For instance, I have found that by admixing stainless steel scrap with the carbide cementing agent, chromium from the stainless steel will enter the case. Chromium alone does not readily form a case on ferrous metal articles, but under the conditions existing in the practice of my invention the silicon-chromium cases are formed readily. Such cases are desirable for some purposes because the surfaces exhibit a high chromium-like luster. Pure chromium metal or ferrochrome can be used instead of stainless steel scrap, although the latter is more desirable because of its relative cheapness. Where the stainless steel contains nickel, such as the 18—8 alloy now in common use, both chromium and nickel will enter the case.

Similar results and modification of case properties may be obtained also by the use of alloying ingredients in the metal or alloy from which the article is made. Thus, the articles may be made from copper steels whereby upon siliconizing there is obtained a silicon case containing copper.

The invention is particularly applicable to the treatment of ferrous metals, such as irons and steels, to confer excellent corrosion resistance, particularly resistance to acid attack. The articles may be made from plain carbon or alloy steels, such as the nickel steels well known in the art. Other alloy steels may of course be used. For example, desirable results are obtained by the use of molybdenum steels, the reason for this being that articles of molybdenum steel siliconized in accordance with the practice of this invention appear to be of heightened resistance to some types of corrosive media. Thus, a 0.1 per cent carbon steel containing about 0.6 per cent of molybdenum after siliconizing in accordance with this invention was very resistant to boiling hydrochloric acid, exposure of the siliconized article to the boiling acid for more than 150 hours being required to produce perforation of the case.

The invention may be applied to both wrought and cast articles. In the latter class it may be noted that ordinary gray irons may tend to swell excessively when treated in accordance with this invention. But non-swelling compositions with about 1 per cent of alloying metals perform satisfactorily. White irons usually are partially malleableized when treated as described herein, and when malleableized products are treated part of the graphitic carbon may be redissolved. In treating malleable iron castings it is possible to simultaneously carry on the siliconizing and malleableizing of the cast article, for a fully malleableized core is produced by cooling slowly from the cementing temperature. Other applications will suggest themselves from the examples given.

Where maximum corrosion resistance is desired ferrous metals should have a sulfur content of not over 0.05 per cent. By observing this precaution there is provided excellent resistance against dilute nitric, sulfuric, hydrochloric, phosphoric and acetic acids in both laboratory and service tests, as well as against moist chlorine and salt spray. For example, pipe elbows treated in accordance with the invention were still in operation four months after installation in hydrochloric acid pickle tubs. In contrast, galvanized malleable elbows corrode entirely through, in the same tubs, after 7 to 10 days' exposure.

Although the invention is particularly adapted for the treatment of ferrous metal articles, it is not restricted thereto. My work has shown that the method provided by the invention is applicable to the cementation of other metals and alloys capable of being siliconized, such, for example, as copper and nickel.

In the practice of the invention the article should be heated and maintained under non-oxidizing conditions. One means of accomplishing this is to heat the article in a reducing or non-oxidizing atmosphere. For example, the article may be heated in a chamber through which there is flowed a current of nitrogen. My tests have shown that where substantially neutral atmospheres, such as nitrogen, are used it is desirable to introduce a small proportion of a reducing gas such as hydrogen. Cases made using an atmosphere of nitrogen alone may when first exposed to highly corrosive media, such as highly ionized mineral acids, show a slight initial loss in weight, although thereafter the resistance to attack is particularly satisfactory. However, the mixed atmospheres just described are desirable because they minimize or eliminate the initial attack just mentioned.

Where silicon carbide is used as the silicon material there is obtained a residue which appears to be almost wholly or largely magnetic, although silicon carbide is itself non-magnetic. The residue increases in weight as compared with the weight of silicon carbide originally used. It is virtually non-malleable and extremely hard, being capable of scatching glass, so that its properties adapt it for abrasive purposes.

I now believe that residue to consist largely of iron carbide. Apart from its exact identity, however, I have discovered that no inert gas, such as nitrogen, need be used if this residue be mixed with fresh silicon carbide or ferro-silicon. The exact reason for this is not known, but all that is necessary is to bring the articles up to temperature in the presence of this residue, suitably mixed with an equal amount of fresh silicon material, and then introduce the chlorine or chloride vapor. Moreover, when this is done the articles can be removed at temperature or cooled down in the furnace without the use of extraneous protective gas.

Where articles of irregular shape are to be cemented they can be packed in the silcon material and treated as described hereinabove. Where cylindrical or tubular articles are to be siliconized I have found a desirable procedure to be to dispose them in parallel relation within a rotatable container which is rotated during treatment. If uniform diffusion of silicon into both surfaces of, for instance, tubular articles is desired in the practice of this embodiment of the invention care should be taken that the articles are not rotated at too great a rate of speed. If the speed of rotation is too great the case formed on the outside of the article will be thinner than that formed on the inside surface. As illustrative of the effect of this precaution, in one test a group of steel tubes were treated in a drum rotated at three revolutions per minute. The case formed on the outside of the tube was somewhat less than half as thick as that formed on the inside of the tube. However, when the rotation of the drum was reduced to one revolution in three minutes the tubes had cases of uniform thickness extending inwardly from both surfaces.

Generally it will be desirable to contact the articles with the silicon material where either stationary or rotary containers are used. If it is desirable for any reason, however, the reagent and article undergoing treatment need not be in actual physical contact as long as the article is exposed to the action of the reagent, as by disposing them in separate communicating chambers, as described hereinabove.

As illustrative of the practice of the invention, reference may be made to one run in which there were treated lengths of seamless tubes of plain carbon steel containing below about 0.1 per cent of carbon. The tubes were of 1.25 inch outside diameter with 0.125 inch wall thickness. Four lengths of tube and 300 grams of 80-mesh silicon carbide were placed in a closed-end drum made from a 36-inch length of extra heavy 3-inch pipe. This drum was revolved in an electric furnace 25 inches long; rings placed inside the container drum at each end kept the tubes in a heated zone 14 inches long at the center of the furnace. The drum was rotated at the rate of one revolution in three minutes. The tubes were heated to 1800° F. while passing a current of nitrogen maintained within the drum. After they had reached that temperature a slow stream of chlorine gas was introduced in the nitrogen stream for two hours at the rate of 0.5 pound per hour, the reagent being introduced during hourly intervals into alternate ends of the drum in the nitrogen stream.

At the end of the test the furnace was allowed to cool, and sections were cut from the treated tubes with a cut-off grinding wheel. The sections were found to be cased uniformly from both surfaces to a depth of about 0.015 to 0.02 inch. This may be shown by immersing the sections in nitric acid, which dissolves out the non-siliconized core leaving the cased portions unaffected. This test is illustrative of the extreme resistance to acid attack of the cases formed by this invention. As further illustrative of this point, one of the tubes in the condition in which it was removed from the furnace was boiled for over 100 hours in 10 per cent sulfuric acid solution before perforation of the case occurred.

As exemplifying the use of ferro-silicon, steel rounds made from S. A. E. 1015 steel were heated in the foregoing apparatus together with 1000 grams of 45 per cent ferro-silicon to a temperature of about 1850° F. When the articles had reached that temperature chlorine gas was introduced at the rate of 0.5 pound per hour, this treatment being continued for two hours. Examination of the treated articles showed that they had a silicon case somewhat over 0.06 inch thick. The case thus formed withstood boiling 10 per cent sulfuric acid for over a week.

In still another test similar material was treated in the same manner except that instead of ferro-silicon there was used a mixture of 90 per cent of silicon carbide and 10 per cent of the 45 per cent ferro-silicon. The articles had a case approximately 0.05 inch thick which withstood sulfuric acid equally well.

An advantage of the product is that the article is cased not only over both major surfaces, but also at the ends, so that its entire exposed surface possesses the extreme resistance to acid attack indicated by the tests just described.

A particularly desirable feature of the present invention is that as a consequence of the siliconizing treatment the articles does not undergo any substantial change in size. In point of fact, my experience thus far has indicated that with high sulfur steel there may be a slight decrease in volume, or size, of the article after being siliconized in accordance with the present invention, and that with low sulfur steel the article will swell about 0.001 to 0.003 inch. Such an increase is slight and is unobjectionable for most purposes. This is in contrast with carbon cementation, the tendency of which is to cause a substantial increase in size of the article. In consequence of this it is possible to form an article to finished shape and size, siliconize it in accordance with the present invention, and thereby have the article ready for use.

It appears also that the articles undergo a loss in weight as contrasted with that of the original article, such weight loss amounting even to as much as 5 to 10 per cent of the original weight. This likewise is in contrast to carburizing procedures, in which the article gains in weight.

Another property of the cases is that of heat resistance. For instance, they resist scaling at high temperatures and under oxidizing conditions much better than common steel, and apparently their resistance to this condition is comparable to that of the lower chromium stainless steels. This in combination with resistance to chemical attack affords a particularly suitable combination of properties for some uses. For example, one furnace part treated in accordance with this invention showed no sign of scaling after two months' use in which it was heated daily to 1800° F. and cooled at the end of the day to room temperature.

Microscopic examination of steels cemented in accordance with this invention has shown good continuity and bonding between the case and core which explains the good adherence of the cases provided by the invention. This examination has indicated also a tendency for the carbon to migrate in advance of the case, thus increasing the carbon concentration in the region between the case and the core. While this phenomenon might be applied to obtain desired steel core structures, it may cause core brittleness in the core with some steels and therefore for some purposes it is desirable to use steels containing not more than about 0.1 per cent of carbon.

The cases provided by the practice of the present invention not only are characterized by excellent corrosion resistance, and by resistance to heat and wear, but they also avoid the disadvantages of the previously used high-silicon steels because the core is relatively tough and soft so that the hard case is backed by material which minimizes breakage. In this respect the articles resemble case-carburized products. Also, the cases provided by this invention are satisfactorily coherent and adherent.

The cases provided by my invention are hard, and therefore being backed by a ductile core they are also extremely resistant to abrasion. They exhibit comparatively low penetration hardness, e. g. 80–85 Rockwell B (148–163 Brinell) but it is difficult or impossible to cut them with hacksaws. Thus the treated articles are adapted to uses in which metals are subjected to conditions in which abrasion may more or less rapidly render them unfit for further use, as, for example, conduits for conveying abrasive materials, for mandrels, and the like and particularly is this true because they are characterized further by non-galling and non-seizing properties, both as to themselves and also as to other metals, even under high pressures. Such articles as automobile engine pump shafts and cylinder liners have been found to be highly resistant to wear after months of continuous operation.

Although the cases, at least those in the higher ranges of silicon, can not ordinarily be cut with a hacksaw, the articles can be ground if any final shaping is necessary. My tests have shown, however, that ordinarily if the article is finished to size prior to being treated no further shaping or sizing will be necessary. Also, the cased articles may be polished to produce a high luster, as by buffing, and the luster is retained in corrosive atmospheres.

While the ductility of the cases is not as great as that of the core, sufficient ductility is present to permit some distortion. Tubes, for example, may be rolled into headers by special methods. The cases do not spall off under vigorous hammering, and under compression they show a higher ductility than in tension.

The thermal conductivity of high-silicon irons is high so that articles treated in accordance with the invention have about the same coefficient of heat transfer as mild steels, and a higher coefficient than the stainless steels.

The cases are not porous in the ordinary sense of the word. I have discovered, however, that they have the power of absorbing liquids, such as lubricating oil, when heated or boiled in them and gasoline or other solvents do not seem to remove the oil. These properties indicate the presence of capillaries of microscopic cross-sectional area. This ability to absorb and retain oil is extremely advantageous, as will be recognized, in the case of moving parts because the case itself thus retains lubricant and maintains lubrication between the parts. In one wear test articles treated in accordance with the invention were boiled in oil and were then used without additional lubrication. These articles stood up about three times as well as similar articles not treated with oil.

As will be obvious, the invention is applicable to the treatment of articles for a great variety of purposes. Automotive parts including cylinder linings, valves, water-pump shafts, bolts and nuts, gears and pistons have been treated in accordance with the invention, and so satisfactory have been the results that some of these articles are now in commercial use. Also, valves, fittings and other parts for the chemical, paper, oil and other industries can be treated advantageously for the purpose of combating corrosion, heat, or wear, or combinations of these destructive factors. Thermocouple and thermometer protection tubes treated in accordance with my method have stood up particularly well in actual service conditions.

As will be recognized from what has been said, the invention is applicable not only to the production of cased articles, but also to the complete impregnation of articles to provide silicon concentrations up to about 14 per cent. This ability to completely impregnate an article, coupled with the increase in electrical resistance of ferrous metals caused by the presence of silicon, also renders the invention applicable to the electrical industry. For instance, stock for making laminated cores may be made by rolling low carbon material to sheet or strip of the desired thickness, cutting it to size and punching the customary holes, and then treating the formed sheets in accordance with the invention, thus producing sheets containing more than 10 per cent of silicon. While these sheets are brittle, due to the high content of silicon, they have sufficient ductility to permit clamping them together to form laminated cores. This is advantageous because, as noted hereinabove, it has not been possible heretofore to make laminated cores from sheets containing more than about 6 per cent of silicon, although it would be desirable to use higher contents of silicon.

In amplification of this aspect of the invention, electrical sheet material in the form of pieces 5½ inches by 1½ inches and 0.015 inch thick, were packed in powdered silicon carbide in an iron container and heated to temperatures between 1500 to 2000° F. in an atmosphere of nitrogen and hydrogen. After being at temperature for about 30 minutes the hydrogen was shut off and chlorine was introduced for two to four hours, while maintaining the desired temperature. The container was cooled in an atmosphere of nitrogen, and the sheets were found to be very flat and to have a silvery luster. They were impregnated throughout and contained from 12 to 14 per cent of silicon, and from 0.05 to 1.06 per cent of carbon, depending on the treating temperature, the higher temperatures producing the higher carbon contents. By lowering the temperature of treatment the carbon content can be decreased. Thus, treatment at 1700° F. and below will give carbon contents under 0.1 per cent, and by using temperatures of at least 1550° F. the 0.015 inch thick sheet is impregnated throughout within about four hours.

As exemplifying the benefits to be derived from the invention in so far as concerns increase in electrical resistance, cast steel resistor grids about 10 inches long and about ⅛ inch thick were treated in accordance with the invention using silicon carbide and chlorine to form cases varying in thickness from about 0.02 to about 0.06 inch. The resistance of the grids, compared with the resistance of the untreated grids, increased progressively from about 139 per cent with a case 0.02 inch thick to about 242 per cent with a case 0.06 inch thick.

Again, a grid of approximately the same size was cut from 10-gauge sheet metal. This was treated in accordance with the invention to provide a case 0.05 inch thick; the resistance of the treated grid was 276 per cent of the resistance of the original, untreated grid.

This aspect of the invention, i. e., the ability to impregnate the article throughout, may be advantageous also in connection with welding and metal spraying since thereby it becomes possible to provide high-silicon material in rod or wire form, as is necessary for these purposes. All that it is necessary to do is to form the base material into rod or wire of appropriate size and subject the rod or wire to the practice of the invention. As illustrating this, low carbon welding rods ⅛ inch in diameter by 36 inches long were treated in accordance with the invention, using silicon carbide and chlorine, with a nitrogen atmosphere as the inert gas, for four hours at 1750° to 1800° F. The process was carried out in a rotary container, as described hereinabove. The rods were found to be impregnated throughout and to contain 14.08 per cent of silicon.

Also, articles of relatively small section, such as rod, scrap, turnings, and the like of low-carbon steel can be treated and then melted to make castings of high-silicon and low-carbon content. The present high-silicon castings contain about 0.6 to 0.7 per cent of carbon, while in accordance with this aspect of the invention high-silicon castings with less than 0.1 per cent of carbon can be produced easily. Such material is advantageous for various purposes, such as the manufacture of stainless steel with 1 to 3 per cent of silicon as now made for internal combustion engine exhaust valves.

It will be apprehended from what has been said that when chlorine gas is used it is introduced at a rate regulated to produce the desired result, in accordance with the temperature and other factors set forth hereinabove. It will be understood also that where chloride is used it will similarly be desirable in most instances to regulate its rate of addition according to the temperature, result desired, etc. Also, while reference is made to the use of chloride vapor, it will be understood that powdered chloride may be blown at a regulated rate into the reaction chamber where it promptly vaporizes and produces the desired result.

This application is a continuation-in-part of my co-pending application Serial No. 37,042, filed August 20, 1935.

According to the provisions of the patent statutes, I have explained the principle and manner of practicing my invention, and have illustrated and described what I now consider to represent its best embodiment. However, I desire to have it understood that, within the scope of the appended claims, the invention may be practiced otherwise than as specifically illustrated and described.

I claim:

1. That method of siliconizing an article formed from metal capable of cementation by silicon which comprises heating that portion of the article which is to be siliconized to an elevated temperature at which silicon impregnation will occur and in the substantial absence of chlorine-containing gases, and then contacting the heated article with a siliconizing reagent formed by heating a member of the group silicon carbide and ferrosilicon in a current of a member of the group chlorine gas and chloride vapor, and continuing such treatment to cause penetration of silicon into the article to a desired depth.

2. That method of siliconizing an article formed from metal capable of cementation by silicon which comprises heating that portion of the article which is to be siliconized under non-oxidizing conditions and in the substantial absence of chlorine-containing gases to a temperature of at least about 1500° F., and then contacting the article with a siliconizing reagent formed by heating a member of the group silicon carbide and ferrosilicon in a current of a member of the group chlorine gas and chloride vapor, and supplying such reagent to the article at a rate at least as great as that of diffusion of silicon into the article.

3. That method of siliconizing an article formed from a metal capable of cementation by silicon which comprises heating the article in the substantial absence of chlorine-containing gases to a temperature of at least 1500° F. in an atmosphere of nitrogen containing a small amount of hydrogen, then contacting the heated article with siliconizing agent formed by heating a member of the group silicon carbide and ferrosilicon in a current of a member of the group chlorine gas and chloride vapor, and continuing such treatment of the article to cause penetration of silicon to a desired depth.

4. That method of siliconizing an article formed from a metal capable of cementation by silicon which comprises disposing the article and a member of the group silicon carbide and ferro-silicon in a closed chamber, heating them therein under non-oxidizing conditions and in the substantial absence of chlorine-containing gases to a temperature of at least about 1500° F., and then introducing into the chamber a current of a member of the group chlorine gas and chloride vapor.

5. That method of siliconizing an article formed from a metal capable of cementation by silicon which comprises disposing the article and a member of the group silicon carbide and ferro-silicon in a closed chamber, heating them therein under non-oxidizing conditions to a temperature of at least about 1500° F., in the substantial absence of chlorine-containing gases and then introducing into the chamber a current of a member of the group chlorine gas and chloride vapor to supply cementing silicon to the article at a rate at least equal to its rate of diffusion into the article.

6. That method of siliconizing an article formed from a metal capable of cementation by silicon which comprises contacting the article and a mixture of silicon carbide and ferro-silicon in a closed chamber, heating them therein under non-oxidizing conditions to a temperature of at least about 1500° F., in the substantial absence of chlorine-containing gases and then introducing into the chamber a current of a member of the group chlorine gas and chloride vapor.

7. That method of siliconizing an article formed from a metal capable of cementation by silicon which comprises disposing the article in a closed chamber together with (1) a member of the group silicon carbide and ferro-silicon, and (2) residue from a preceding treatment, heating them therein to a temperature of at least 1500° F., in the substantial absence of chlorine-containing gases and then introducing into the chamber a current of a member of the group chlorine gas and chloride vapor.

8. That method of siliconizing an article formed from a metal capable of cementation by silicon which comprises heating the article under non-oxidizing conditions and in the substantial absence of chlorine-containing gases in a closed chamber to a temperature of at least about 1500° F., passing into said chamber silicon-cementing gas formed by heating in a separate chamber a member of the group silicon carbide and ferro-silicon, and introducing a current of a member of the group chlorine gas and chloride vapor, and continuing such treatment of the article to cause penetration of silicon to a desired depth.

9. That method of siliconizing a ferrous base article which comprises contacting the article under non-oxidizing conditions and at a temperature above about 1500° F. with a siliconizing reagent formed by heating a member of the group silicon carbide and ferro-silicon in a current of a member of the group chlorine gas and chloride vapor, and continuing such treatment to cause penetration of silicon into the article to a desired depth.

10. A method according to claim 9, said article containing less than about 0.05 per cent of sulfur.

11. That method of siliconizing a ferrous base article which comprises heating the article in the substantial absence of chlorine-containing gases to a temperature of at least about 1500° F. under non-oxidizing conditions in contact with a member of the group silicon carbide and ferro-silicon, and then introducing a current of a member of the group chlorine gas and chloride vapor to supply cementing silicon to the article at a rate at least as great as its rate of diffusion into the article, and continuing such treatment of the article to cause penetration of silicon to a desired depth.

12. A method according to claim 11, said article containing less than about 0.05 per cent of sulfur.

13. That method of siliconizing a ferrous base article which comprises heating the article in the substantial absence of chlorine-containing gases under non-oxidizing conditions to a temperature of at least about 1500° F. in contact with silicon carbide and ferro-silicon, and then introducing a current of a member of the group chlorine gas and chloride vapor, and continuing such treatment of the article to cause penetration of silicon to a desired depth.

14. That method of siliconizing a ferrous base article which comprises disposing the article and silicon carbide in contact in a closed chamber, heating them therein under non-oxidizing conditions to a temperature of at least 1500° F., and then introducing into the chamber a current of a member of the group chlorine gas and chloride vapor.

15. A method according to claim 5 in which said non-oxidizing condition is attained by adding residue from a previous treatment.

16. A method according to claim 9, said article containing less than about 0.05 per cent of sulfur, and said non-oxidizing condition being attained by adding residue from a previous treatment.

17. That method of siliconizing an article formed from a metal capable of cementation by silicon which comprises shaping the article to completed form, heating the shaped article under non-oxidizing conditions and in the substantial absence of chlorine-containing gases to at least about 1500° F., and then contacting it with siliconizing reagent formed by heating a member of the group silicon carbide and ferro-silicon in a current of a member of the group chlorine gas and chloride vapor.

18. That method of siliconizing a ferrous base article which comprises shaping the article to completed form and size, heating the shaped article in the substantial absence of chlorine-containing gases under non-oxidizing conditions to a temperature of at least about 1500° F. in contact with a member of the group silicon carbide and ferro-silicon, then introducing a current of a member of the group chlorine gas and chloride vapor, and continuing such treatment to cause penetration of silicon to a desired depth into the article.

19. That method of siliconizing an article cylindrical in form and made from a metal capable of cementation by silicon which comprises disposing the article in a closed chamber in contact with a member of the group silicon carbide and ferrosilicon, heating the article therein to a temperature of at least about 1500° F. in the substantial absence of chlorine-containing gases, then introducing a current of a member of the group chlorine gas and chloride vapor, and causing rotation of the heated article in the chamber.

20. That method of siliconizing a ferrous base article of cylindrical form which comprises disposing the article in a closed chamber in contact with a member of the group silicon carbide and ferro-silicon, heating the article in the substantial absence of chlorine-containing gases to a temperature of at least about 1500° F., then introducing a current of a member of the group chlorine gas and chloride vapor to supply silicon to the article at a rate at least as great as its rate of diffusion into the article while causing rotation of the heated article in the chamber, and continuing such treatment to cause penetration of silicon to a desired depth into the article.

21. That method of siliconizing a tubular article made from a metal capable of cementation by silicon which comprises disposing the article in a closed chamber in contact with a member of the group silicon carbide and ferrosilicon, heating the article in the substantial absence of chlorine-containing gases to a temperature of at least about 1500° F., then introducing a current of a member of the group chlorine gas and chloride vapor, and rotating the heated article in the chamber at a rate such as to cause penetration of silicon substantially uniformly from the interior and exterior surfaces of the tube.

22. That method of siliconizing a ferrous base tube which comprises disposing the tube in a closed chamber in contact with silicon carbide, heating the tube to a temperature of at least about 1500° F., then introducing a current of chlorine gas, and rotating the tube at a rate such as to cause penetration of silicon uniformly from the interior and exterior surfaces of the tube.

23. That method of siliconizing an austenitic steel article which comprises heating the article under non-oxidizing conditions and in the substantial absence of chlorine-containing gases to a temperature above about 1500 F. in contact with a member of the group silicon carbide and ferro-silicon, and then introducing a current of a member of the group chlorine and a chloride vapor.

24. That method of siliconizing a ferrous base article which comprises heating the article to a temperature above about 1500° F. under non-oxidizing conditions and in the substantial absence of chlorine-containing gases in contact with a mixture of a metal and a member of the group silicon carbide and ferro-silicon, and then introducing a current of a member of the group chlorine gas and chloride vapor, and thereby causing cementation of the article with silicon and said metal.

25. As a new article of manufacture, a metallic article provided in its marginal layers with a coherent and adherent siliconized case characterized by ability to absorb and tenaciously retain substantial amounts of oil, by high resistance to wear and acid corrosion, and the article being characterized by retaining susbtantially its original size.

26. As a new article of manufacture, a steel article containing less than about 0.05 per cent of sulfur and having its marginal layers provided with a coherent silicon case and thereby being highly resistant to wear and to acid attack, and capable of absorbing and tenaciously retaining substantial amounts of oil.

27. That method of siliconizing an article formed from metal capable of cementation by silicon which comprises contacting the article in the substantial absence of chlorine-containing gases under non-oxidizing conditions and at a temperature of at least about 1500° F. with a member of the group silicon carbide and ferro-silicon, then introducing a current of a member of the group chlorine and chloride vapor, and regulating the rate at which said chlorine or chloride vapor is introduced and thereby regulating the rate at which the silicon penetrates the article.

28. A method according to claim 1, said article containing less than about 0.05 per cent of sulfur.

29. A method according to claim 4, said article containing less than about 0.05 per cent of sulfur.

30. A method according to claim 14, said article containing less than about 0.05 per cent of sulfur.

HARRY K. IHRIG.